June 21, 1927.                         1,633,376
J. R. FREEMAN
LANTERN SLIDE
Filed Nov. 10, 1923          2 Sheets-Sheet 1
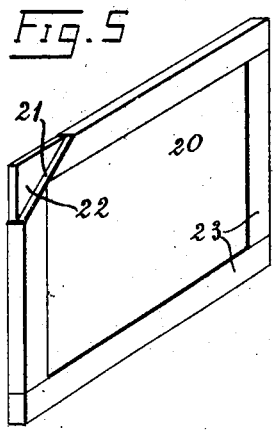
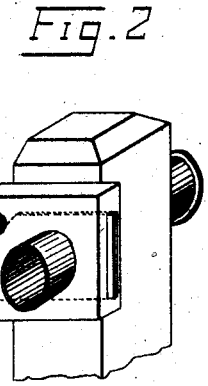
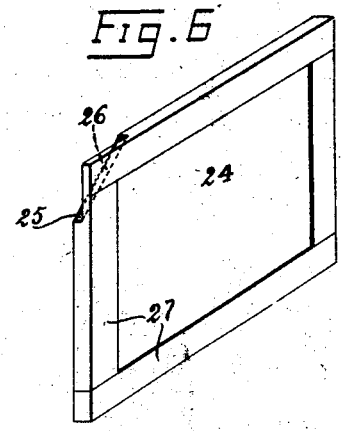
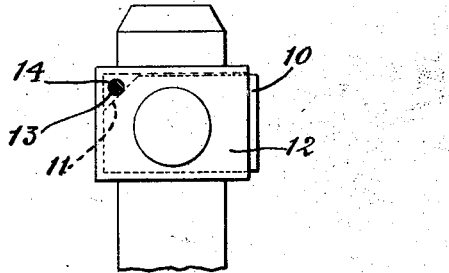
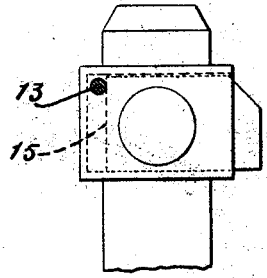
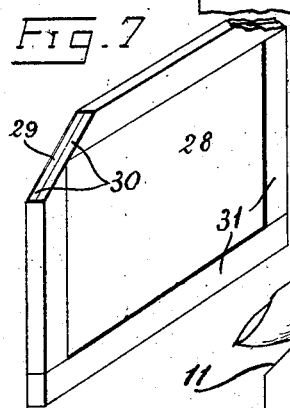
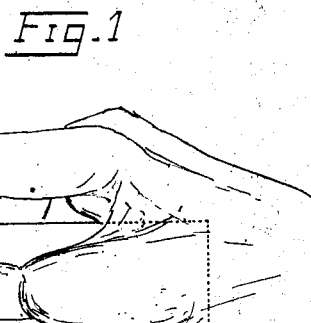
Inventor:
John R. Freeman
By his Atty June 21, 1927.

J. R. FREEMAN 1,633,376

LANTERN SLIDE

Filed Nov. 10, 1923    2 Sheets-Sheet 2

INVENTOR
John R. Freeman.
BY
Gustav Drews
ATTORNEY

Patented June 21, 1927.

1,633,376

UNITED STATES PATENT OFFICE.

JOHN R. FREEMAN, OF PROVIDENCE, RHODE ISLAND.

LANTERN SLIDE.

Application filed November 10, 1923. Serial No. 674,085.

The present invention relates to picture projecting devices, such as magic lanterns, stereopticons and the like, and more particularly relates to the picture slides for these devices, and one object of the invention is to provide the picture slides with means whereby the operator when in the dark is enabled to insert the slide in operative position in the slide box or slide carrier.

Another object is to provide the slide receptacle or slide box with means which indicates to the operator that the slide is in operative position in the slide receptacle or slide box, or will indicate to him that he has incorrectly inserted the slide, this means being removable for permitting use in the device of customary slides.

These and other features, capabilities and advantages of the invention will appear from the subjoined detailed description of embodiment of the invention illustrated in the accompanying drawings in which Figure 1 is a side view of one of my slides in the hand of the operator and indicating that the slide is in proper position for insertion in the device;

Fig. 2 is a perspective view of a magic lantern, from the rear thereof, showing in dot and dash lines one of my slides therein and the means cooperating therewith for positioning the slides in the slide receptacle;

Fig. 3 is a fragmentary rear view of a magic lantern and one of my slides in operative position therein and in engagement with the slide positioning means;

Fig. 4 is a fragmentary rear view of a magic lantern and one of my slides incorrectly inserted therein and in engagement with the positioning means, whereby the incorrect position of the slide is indicated;

Fig. 5 illustrates in perspective a connected slide and cover glass in which the slide is clipped;

Fig. 6 illustrates in perspective a connected slide and cover glass in which the cover is clipped;

Fig. 7 shows a connected slide and cover glass in which both the slide and cover glass are clipped;

Similar reference characters denote similar parts throughout the several views.

Figure 8:
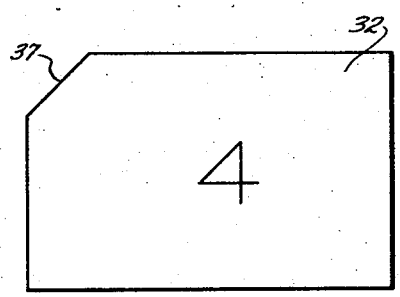
Fig. 8 represents a side elevation of a simple slide in the correct position for use in a stereopticon lantern.
Figure 9:
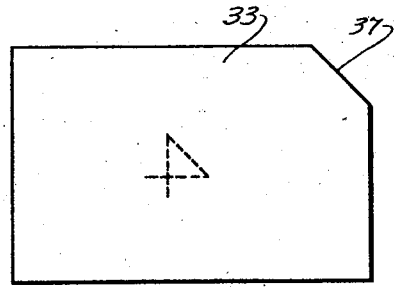
Fig. 9 illustrates the same slide as shown in Fig. 8 in reverse position.
Figure 10:
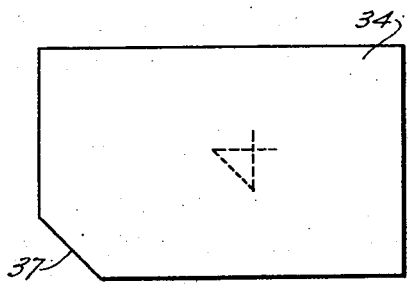
Fig. 10 illustrates the slide of Fig. 8 in reverse and inverted position.
Figure 11:
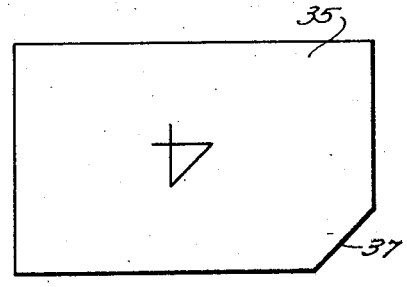
Fig. 11 illustrates the slide of Fig. 8 in inverted position.

Referring to Fig. 1, the picture slide 10, which is of the customary rectangular form, has a portion clipped from one corner of its margin, thereby providing an inclined portion 11 connecting a side and adjacent end of the slide, the portion 11 by contact with the index finger of the operator serving to indicate to him in the dark that the slide is held in correct position for insertion in the picture projecting device in operative relation thereto.

Referring to Figs. 3 and 4, I provide the slide receptacle or box 12 of the picture projecting device, in the present instance a magic lantern, with a pin or peg 13 which is insertable through a hole 14 in the outer wall of the box 12 and engageable with the inner wall of the box, or it may be seated in a suitable manner, not shown, in the inner wall of the box, the pin 13 being so arranged relative to the box 12 that when the picture slide 10 is in operative position in the box, the inclined portion 11 of the slide will engage the periphery of the pin 13 and further insertion of the slide will be prevented. In the event of inadvertency of the operator and incorrect insertion by him of the slide in the box 10, the periphery of the pin 13 will engage the straight end 15 of the slide and at once indicate to the operator his mistake.

For the use of picture slides of the customary form the pin 13 is removed.

In Fig. 5 there is illustrated another form of the invention in which the slide 20 has one of its corners clipped to form the inclined portion 21, and the cover glass is secured thereto in any suitable manner such as by means of a border binding 23 of paper held in place by any suitable adhesive substance such as paste.

In Fig. 6 there is illustrated still another form in which the slide 24 is left intact and the cover glass 25 is clipped having one of its corners clipped to form the inclined portion 26, the slide 24 and cover glass 25 here too being secured together by a suitable border binding 27.

In Fig. 7 there is illustrated still another form in which both the slide 28 and the cover glass 29 have their corners clipped to form the alined inclined portions 30, the slide 28 and cover glass 29 here too being secured together by a suitable border binding 31.

Of course it is understood that with the constructions illustrated in Figs. 5 and 6 the peg 13 must be removed before the slide can be inserted into the projecting machine.

Figs. 8 to 11 inclusive represent the picture slides 32 to 35 inclusive, in this case either a plain picture container slide or one with a cover glass secured thereto, wherein no frame or binding receptacle is and to surround the slide at its outer periphery. These picture slides are in this case to be kept in proper sequence in a receptacle 36 so as to insure that the clipped or inclined corners 37, are all in the same plane. By this means, it is possible to dispense altogether with the pin or peg 13 which is inserted in the hole 14 of the box 12 so as to prevent any slide from being inserted in the wrong position.

Figure 13:
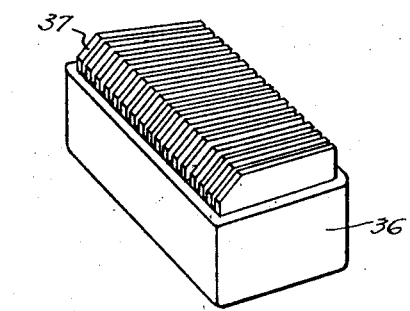
Fig. 13 illustrates a perspective view of the same slide as shown positioned correctly in a receptacle in Fig. 12.
Figure 12:
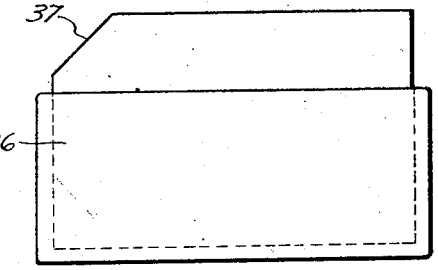
Fig. 12 illustrates a side view of a container or receptacle with a side elevation of a slide correctly positioned therein.

In other words by the modification shown in Figs. 12 and 13 it is possible to prearrange the slides in the correct position before the stereopticon performance is to be started and then present the slides in the slide receptacle of the stereopticon device at any desired speed, but always in correct position, since the operator in the dark needs but to draw his hand along the edge of the receptacle 36 to note whether there is any slide which is not in proper position.

Since the slide may be placed in any of four different positions as shown in Figs. 8 to 11 inclusive, it is of course advantageous to have the slides in correct order. By means of the inclined or clipped corner 37 there can be only one correct position, that shown in Fig. 8, since all the positions of the slide will result in the clipped corner 37 being absent from the upper left or right corner of the slide as the case may be, and notice thereof easily ascertained by the sense of feeling of the operator in the dark.

No attempt is being made in the application to claim a receptacle of specific shape to hold these slides, the feature in this application being solely to the novel construction of the picture slide member.

In the appended claims the term "picture slide" will be understood to mean either a plain picture containing slide such as illustrated in Fig. 1 or a slide with the cover glass secured thereto as illustrated in Figs. 5, 6 and 7.

It is obvious that various changes and modifications may be made to the details of construction without departing from the general spirit of the invention as set forth in the appended claims.

What I claim and desire to protect by Letters Patent is:

1. A lantern slide adapted to co-function with a plurality of lantern slides, said slide comprising a picture containing plate having a clipped corner, a glass cover having a clipped corner, and means for securing the glass cover to said plate with the clipped corners registering with one another whereby the slides would co-function with one another to facilitate arranging them in proper position preparatory to insertion in a projecting machine and whereby each slide would individually function to facilitate proper insertion in a projecting machine.

2. The combination with a picture projecting device having a picture slide receptacle, of a picture slide insertable in said receptacle and having an edge portion adapted for indicating in the dark by the sense of touch of the operator the proper position of the slide for insertion thereof in said slide receptacle; and means insertable in said slide receptacle and engageable with said indicating portion of the picture slide for determining the proper position of the slide in said receptacle.

3. The combination, with a picture projecting device having a picture slide receptacle, of a picture slide insertable in said receptacle, said slide having an inclined edge portion for indicating the proper inserting portion of the slide in the dark, and means insertable in said slide receptacle and engageable with the inclined edge portion of the picture slide for determining the proper position of the slide in said receptacle.

4. The combination, with a picture projecting device having a picture slide receptacle provided with opposed walls, of a picture slide having an edge portion adapted for indicating in the dark by the sense of touch of the operator the proper position of the slide for insertion thereof in said slide receptacle; and means passing through one of said walls and engageable with said indicating portion of the picture slide for determining the proper position of the slide in said receptacle between said walls.

5. The combination, with a picture projecting device having a picture slide receptacle provided with opposed walls, of a picture slide insertable in said receptacle and having an inclined edge portion; and a removable pin passing through one of said walls and engageable with the inclined edge portion of the picture slide for determining the proper position of the slide in said receptacle between said walls.

6. In a picture projecting device, the combination with a picture slide receptacle of a picture slide insertable in said receptacle and having means thereon for indicating in the dark, by sense of touch of the operator, the proper position of the slide for insertion thereof in the receptacle and means in said slide receptacle for cooperating with said slide indicating means for determining the proper position of the slide in said receptacle.

7. In a picture projecting device, the combination with a picture slide receptacle, of a picture containing slide, having an inclined edge portion, a rectangular glass cover attached to said slide, and means insertable in the slide receptacle and engageable with the inclined edge portion for determining the proper position of the said slide in said receptacle.

8. In a picture projecting device, the combination with a picture slide receptacle of a picture containing slide, and glass cover attached thereto, one having an inclined edge portion and the other a rectangular configuration, and means insertable in said slide receptacle and engageable with the inclined edge portion of the picture slide for determining the proper position of the slide in said receptacle.

JOHN R. FREEMAN.